United States Patent
Hagiwara et al.

(10) Patent No.: US 11,515,532 B2
(45) Date of Patent: Nov. 29, 2022

(54) ELECTRODE, NONAQUEOUS ELECTROLYTE BATTERY AND BATTERY PACK

(71) Applicant: KABUSHIKI KAISHA TOSHIBA, Minato-ku (JP)

(72) Inventors: Asuna Hagiwara, Kashiwazaki (JP); Keigo Hoshina, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 205 days.

(21) Appl. No.: 16/806,157

(22) Filed: Mar. 2, 2020

(65) Prior Publication Data

US 2020/0203724 A1  Jun. 25, 2020

Related U.S. Application Data

(63) Continuation of application No. PCT/JP2017/036154, filed on Oct. 4, 2017.

(51) Int. Cl.
*H01M 4/505* (2010.01)
*C01G 53/00* (2006.01)
(Continued)

(52) U.S. Cl.
CPC ............ *H01M 4/505* (2013.01); *C01G 53/50* (2013.01); *H01M 4/525* (2013.01);
(Continued)

(58) Field of Classification Search
None
See application file for complete search history.

(56) References Cited

U.S. PATENT DOCUMENTS

| 8,715,859 B2 | 5/2014 | Isozaki et al. |
| 10,319,986 B2 | 6/2019 | Tuduki et al. |

(Continued)

FOREIGN PATENT DOCUMENTS

| CN | 107004831 A | 8/2017 |
| EP | 2 555 287 A1 | 2/2013 |

(Continued)

OTHER PUBLICATIONS

Extended European Search Report dated Mar. 25, 2021 in European Patent Application No. 17927885.8, 7 pages.
(Continued)

*Primary Examiner* — Daniel S Gatewood
(74) *Attorney, Agent, or Firm* — Oblon, McClelland, Maier & Neustadt, L.L.P.

(57) ABSTRACT

According to an embodiment, there is provided an electrode including an active material-containing layer. A logarithmic differential pore volume distribution curve of the active material-containing layer by a mercury intrusion method includes first and second peaks. The first peak is a local maximum value in a range where a pore size is from 0.1 μm or more to 0.5 μm or less. The second peak is a local maximum value in a range where the pore size is from 0.5 μm or more to 1.0 μm or less. An intensity A1 of the first peak and an intensity A2 of the second peak satisfy $0.1 \leq A2/A1 \leq 0.3$. A density of the active material-containing layer is from 2.9 g/cm³ or more to 3.3 g/cm³ or less.

5 Claims, 5 Drawing Sheets

(51) Int. Cl.
H01M 4/525 (2010.01)
H01M 4/02 (2006.01)

(52) U.S. Cl.
CPC ...... *C01P 2006/10* (2013.01); *C01P 2006/14* (2013.01); *C01P 2006/16* (2013.01); *C01P 2006/40* (2013.01); *H01M 2004/021* (2013.01); *H01M 2004/028* (2013.01)

(56) References Cited

U.S. PATENT DOCUMENTS

| | | | | |
|---|---|---|---|---|
| 2010/0209771 | A1* | 8/2010 | Shizuka | H01M 4/505 |
| | | | | 429/207 |
| 2012/0295157 | A1 | 11/2012 | Nagai et al. | |
| 2013/0330623 | A1 | 12/2013 | Matsushita et al. | |
| 2014/0272562 | A1 | 9/2014 | Watanabe et al. | |
| 2015/0086851 | A1* | 3/2015 | Morita | H01M 10/052 |
| | | | | 429/163 |
| 2017/0324080 | A1* | 11/2017 | Tuduki | H01M 4/366 |

FOREIGN PATENT DOCUMENTS

| | | | |
|---|---|---|---|
| EP | 2 639 861 A1 | 9/2013 | |
| JP | 2014-13748 A | 1/2014 | |
| JP | 2014-179240 A | 9/2014 | |
| JP | 2017-4635 A | 1/2017 | |
| WO | WO 2011/089702 A1 | 7/2011 | |
| WO | WO 2013/161083 A1 | 10/2013 | |
| WO | WO 2016/084346 A1 | 6/2016 | |
| WO | WO-2016084346 A1 * | 6/2016 | ............ H01M 4/131 |

OTHER PUBLICATIONS

International Search Report dated Dec. 26, 2017 in PCT/JP2017/036154 filed Oct. 4, 2017, 1 page.

Hayakawa, S., "Powder property Measuring Method," Asakura Shoten, (with English Translation), Oct. 1973, pp. 257-259.

Jinbo, G. et al., "Handbook of Fine Particles," Asakura Shoten, (with English Translation), Sep. 1991, pp. 151-152.

* cited by examiner

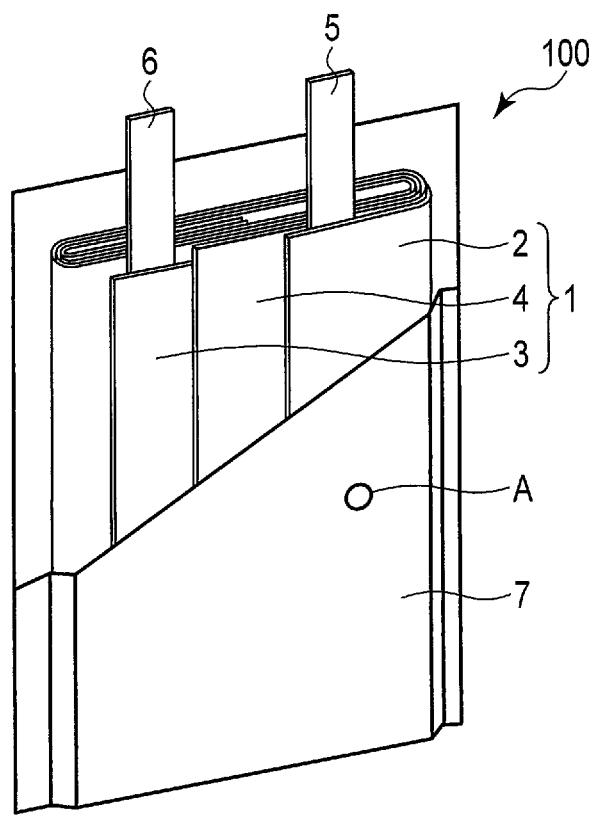
F I G. 1
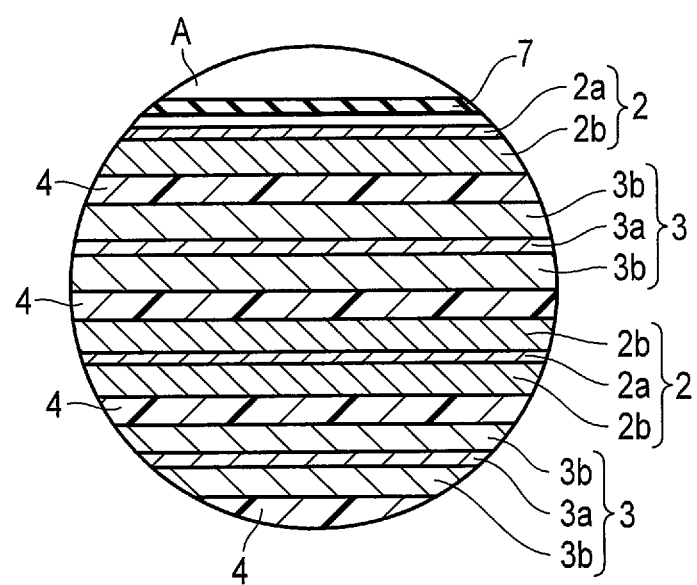
F I G. 2

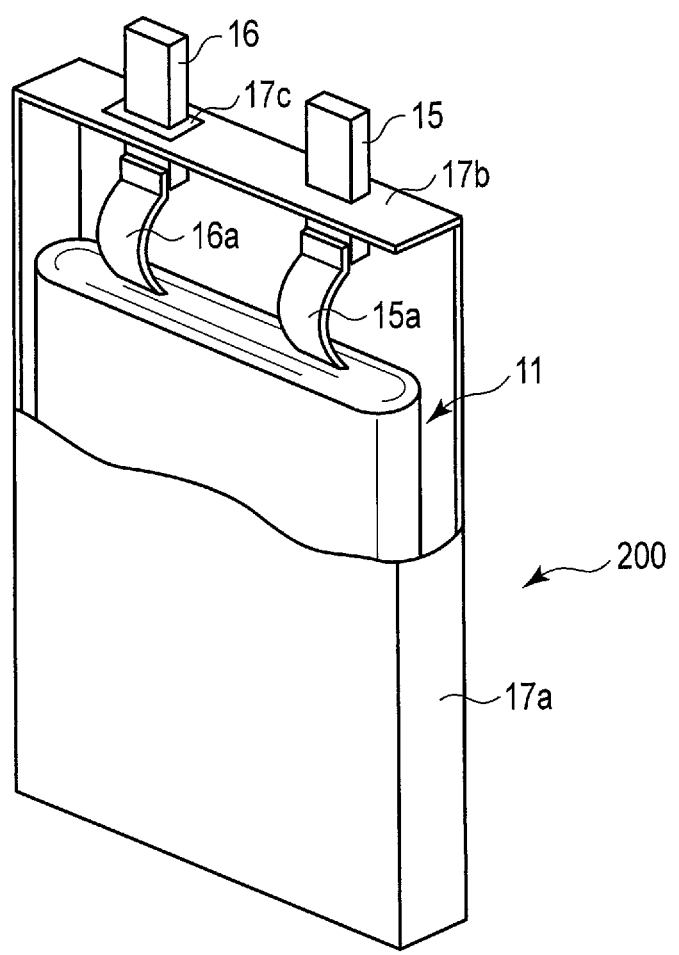
F I G. 3

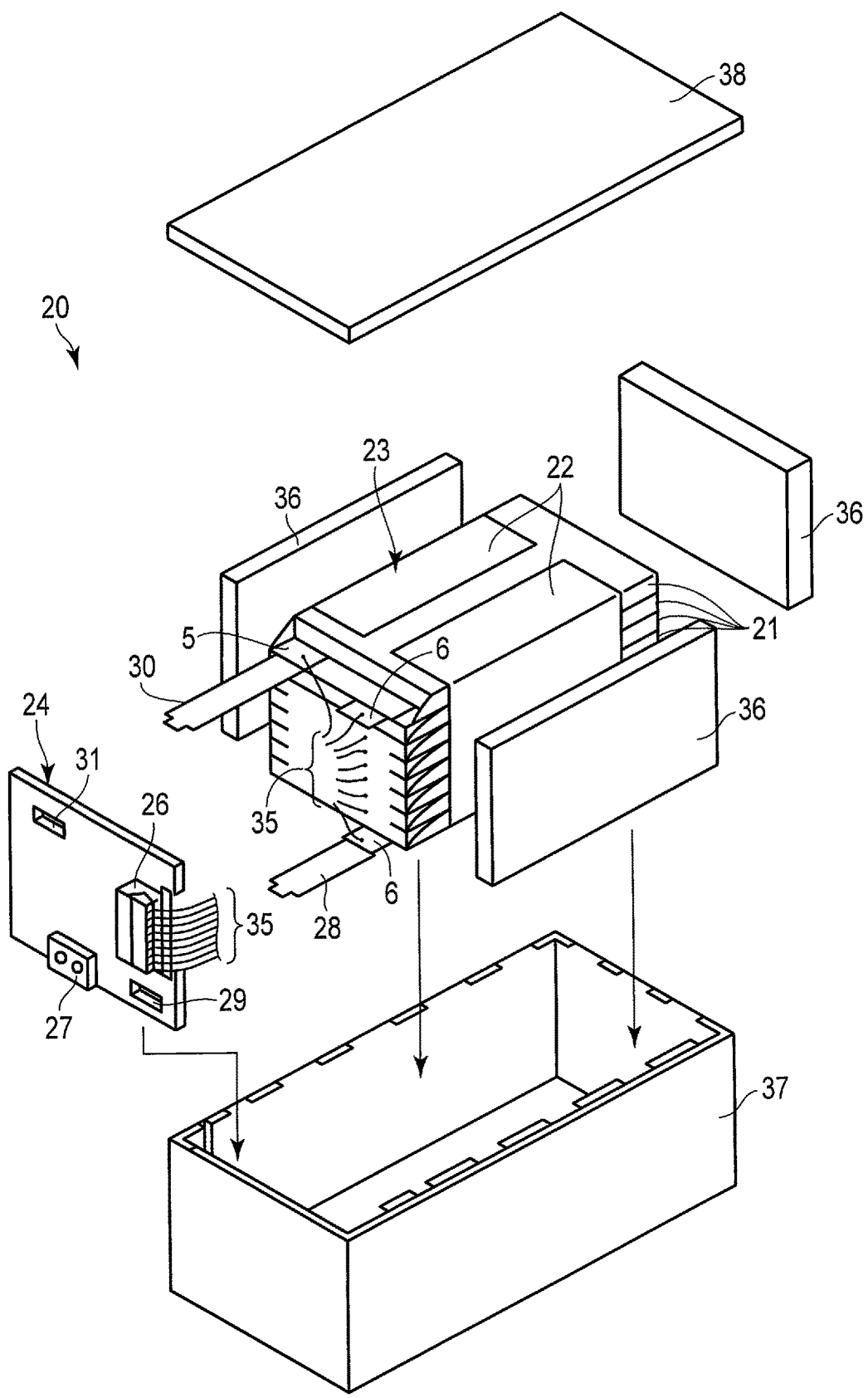
F I G. 4

ELECTRODE, NONAQUEOUS ELECTROLYTE BATTERY AND BATTERY PACK

CROSS-REFERENCE TO RELATED APPLICATIONS

This is a Continuation Application of PCT Application No. PCT/JP2017/036154, filed Oct. 4, 2017, the entire contents of which are incorporated herein by reference.

FIELD

Embodiments described herein relate generally to an electrode, a nonaqueous electrolyte battery, and a battery pack.

BACKGROUND

A lithium ion secondary battery has been widely used in portable devices, automobiles, storage batteries, and the like. The lithium ion secondary battery is a power storage device that is expected to expand in market scale.

The lithium ion secondary battery includes an electrode including a positive electrode and a negative electrode, and an electrolyte. The electrode of the lithium ion secondary battery includes a current collector and an active material-containing layer provided on a main surface of the current collector. The active material-containing layer of the electrode is a porous body capable of holding an electrolyte. The electrode of the lithium ion secondary battery can be obtained by, for example, applying a slurry containing active material particles to the main surface of a current collector made of a metal foil, drying the applied main surface to obtain an active material-containing layer, and then performing a press treatment. The active material particle includes, for example, primary particles and secondary particles. The secondary particles are formed an aggregate of the primary particles, and a particle size thereof is larger than the particle size of the primary particle.

Further enhancement of energy density of the lithium ion secondary battery has been studied. As one of means for enhancing the energy density of the lithium ion secondary battery, increasing the density of electrodes has been studied. As a method for increasing the density of the electrodes, for example, it is conceivable to adjust the particle size of the active material particles or to increase an electrode pressing pressure.

However, when the particle size of the active material particles is adjusted such that the proportion occupied by the primary particles in the active material-containing layer is increased and the proportion occupied by the secondary particles is reduced, it is difficult to secure a conductive path, which leads to tendency to reduce electron conductivity. In addition, when the density of the electrode is enhanced, the proportion of voids in the active material-containing layer is reduced, so that the electrolyte is less likely to be impregnated into the active material-containing layer. As a result, charge/discharge rate characteristics may be degraded.

On the other hand, if the pores having a large diameter are increased by increasing the proportion occupied by the secondary particles in the active material-containing layer, the impregnation property of the electrolyte is improved. However, when the proportion occupied by the secondary particles is high, the lithium ion diffusivity in the active material-containing layer tends to decrease.

In order to solve such a problem, it has been studied to improve the output characteristics of the battery by specifying pore distribution of a positive electrode obtained by a mercury intrusion method.

BRIEF DESCRIPTION OF THE DRAWINGS

FIG. 1 is a partially cutaway perspective view illustrating an example of a nonaqueous electrolyte battery according to a second embodiment.

FIG. 2 is an enlarged sectional view of a part A of the nonaqueous electrolyte battery illustrated in FIG. 1.

FIG. 3 is a partially cutaway perspective view illustrating another example of the nonaqueous electrolyte battery according to the second embodiment.

FIG. 4 is an exploded perspective view schematically illustrating an example of the battery pack according to a third embodiment.

DETAILED DESCRIPTION

Figure 5:
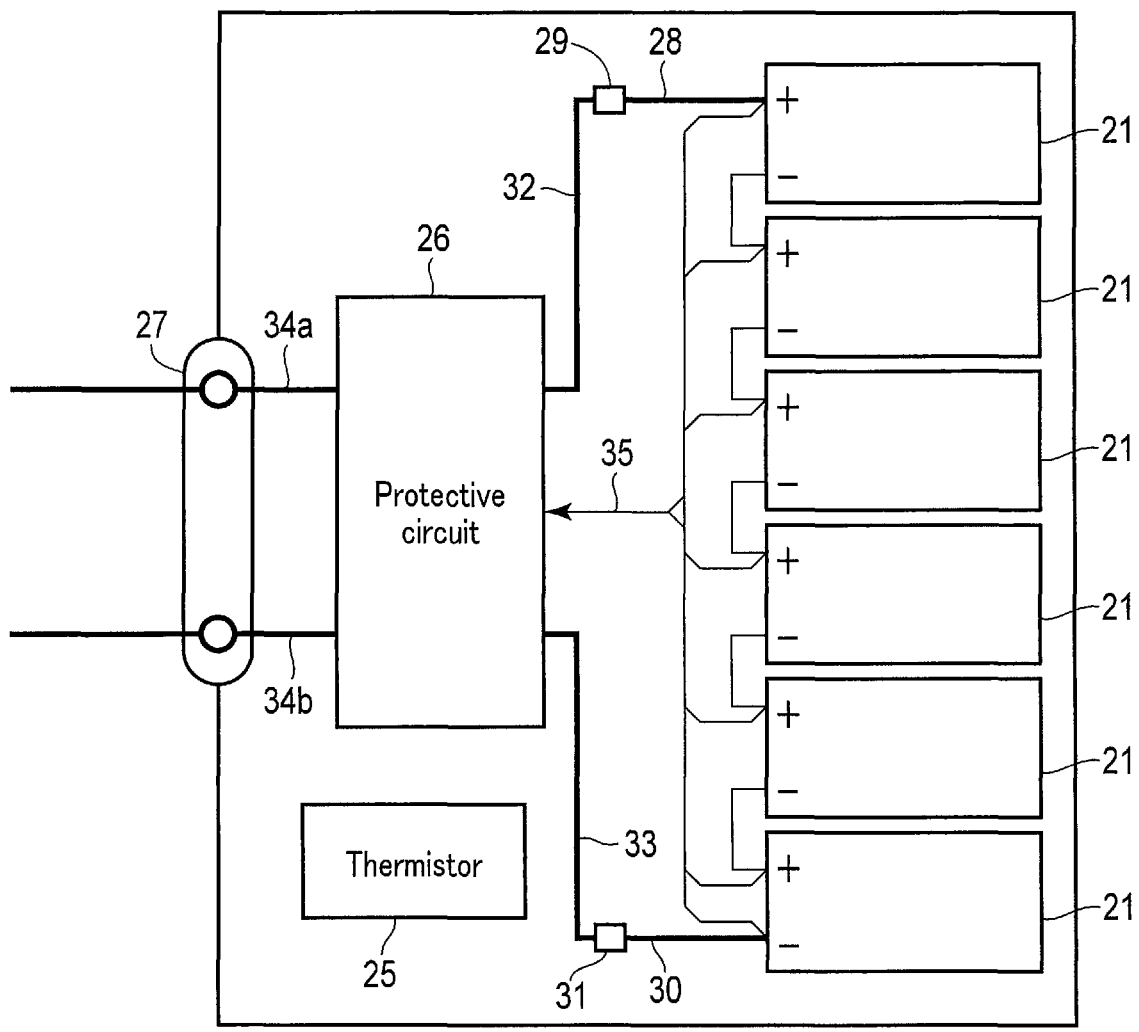
FIG. 5 is a block diagram illustrating an example of an electric circuit of the battery pack as illustrated in FIG. 4.

According to an embodiment, an electrode is provided. The electrode includes an active material-containing layer containing active material particles. The active material particles containing particles of a lithium-containing nickel-cobalt-manganese composite oxide represented by the following Formula (1):

$$Li_{1-x}Ni_{1-a-b}Co_aMn_bO_2 \qquad (1).$$

In the Formula (1), x is in a range of $-0.2 \leq x \leq 0.5$, a is in a range of $0 < a \leq 0.4$, and b is in a range of $0 < b \leq 0.4$. A logarithmic differential pore volume distribution curve of the active material-containing layer by a mercury intrusion method includes a first peak and a second peak. The first peak is a local maximum value in a range where a pore size is from 0.1 μm or more to 0.5 μm or less. The second peak is a local maximum value in a range where the pore size is from 0.5 μm or more to 1.0 μm or less and in a range where the pore size is larger than the pore size of the first peak. An intensity A1 of the first peak and an intensity A2 of the second peak satisfy a relational expression of $0.1 \leq A2/A1 \leq 0.3$. A density of the active material-containing layer is from 2.9 g/cm³ or more to 3.3 g/cm³ or less.

According to another embodiment, a nonaqueous electrolyte battery is provided. The nonaqueous electrolyte battery includes a positive electrode which is the electrode according to the embodiment, a negative electrode, and a nonaqueous electrolyte. The negative electrode includes a negative electrode active material.

According to another embodiment, a battery pack is provided. The battery pack includes the nonaqueous electrolyte battery according to the embodiment.

Hereinafter, embodiments will be described with reference to the drawings. It is to be noted that the same reference numerals are given to the same components throughout the embodiments, and redundant description will be omitted. In addition, each drawing is a schematic view for promoting the explanation and understanding of the embodiment, and shapes, dimensions, ratios, and the like thereof are different from those of an actual apparatus, and these can be appropriately designed and changed in consideration of the following description and known techniques.

First Embodiment

According to the first embodiment, an electrode is provided. The electrode includes an active material-containing layer containing active material particles. The active material particle includes particles made of a lithium-containing nickel-cobalt-manganese composite oxide represented by the following Formula (1):

$$Li_{1-x}Ni_{1-a-b}Co_aMn_bO_2 \qquad (1)$$

In the Formula (1), x is in the range of −0.2≤x≤0.5, a is in the range of 0<a≤0.4, and b is in the range of 0<b≤0.4. The logarithmic differential pore volume distribution curve of the active material-containing layer by a mercury intrusion method includes a first peak and a second peak. The first peak is a local maximum value where a pore size is in the range of 0.1 μm or more and 0.5 μm or less. The second peak is a local maximum value in the range where the pore size is in the range of 0.5 μm or more and 1.0 μm or less, and in a range where the pore size is larger than the pore size of the first peak. An intensity A1 of the first peak and an intensity A2 of the second peak satisfy a relational expression of 0.1≤A2/A1≤0.3. A density of the active material-containing layer is 2.9 g/cm³ or more and 3.3 g/cm³ or less.

In the active material-containing layer of the electrode according to the first embodiment, a ratio A2/A1 of the intensity A2 of the second peak to the intensity A1 of the first peak is in the range of 0.1 or more and 0.3 or less. It can be said that the active material-containing layer of such an electrode has pores having a relatively small pore size of 0.1 μm or more and 0.5 μm or less and pores having a relatively large pore size of 0.5 μm or more and 1.0 μm or less in an appropriate balance. The active material-containing layer of the electrode according to the first embodiment has excellent electrolyte impregnation property and electron conductivity, and also has excellent lithium ion diffusivity. The active material-containing layer of the electrode according to the first embodiment has a high density of 2.9 g/cm³ or more and 3.3 g/cm³ or less. Therefore, the battery using the electrode according to the first embodiment can realize excellent rate characteristics and high energy density.

The electrode according to the first embodiment will be described in detail below.

The electrode according to the first embodiment may include a current collector. That is, the electrode according to the first embodiment can include a current collector and an active material-containing layer formed on a main surface of the current collector. The active material-containing layer may be formed on one main surface of the current collector, or may be formed on both main surfaces.

The current collector may include a portion where the active material-containing layer is not carried. This portion can serve as an electrode tab. Note that, the electrode may further include an electrode tab separate from the current collector.

As the current collector, a sheet containing a material with high electric conductivity can be used. For example, an aluminum foil or an aluminum alloy foil can be used as the current collector. In a case where the aluminum foil or the aluminum alloy foil is used, a thickness thereof is preferably 20 μm or less. The aluminum alloy foil can include magnesium, zinc, silicon, and the like. Further, the aluminum alloy foil may contain a transition metal. The content of the transition metal in the aluminum alloy foil is preferably 1% by mass or less. Examples of the transition metal include iron, copper, nickel, or chromium, for example.

The active material particles include particles made of a lithium-containing nickel-cobalt-manganese composite oxide represented by the following Formula (1):

$$Li_{1-x}Ni_{1-a-b}Co_aMn_bO_2 \qquad (1).$$

In the Formula (1), x is in the range of −0.2≤x≤0.5, a is in the range of 0<a≤0.4, and b is in the range of 0<b≤0.4. x can be varied by the lithium-containing nickel-cobalt-manganese composite oxide which absorbs or releases lithium ions. That is, when charging proceeds and the lithium-containing nickel-cobalt-manganese composite oxide releases the lithium ions, x tends to increase. Further, when discharging proceeds and the lithium-containing nickel-cobalt-manganese composite oxide absorbs the lithium ions, x tends to decrease.

In the above Formula (1), by setting the value of a to 0.4 or less, the thermal stability as an active material can be increased. By setting the value of b to 0.4 or less, the discharge capacity can be increased.

As the active material, a mixture of a lithium-containing nickel-cobalt-manganese composite oxide and another active material can be used. Examples of other active materials include a lithium nickel composite oxide (such as $LiNiO_2$), a lithium cobalt composite oxide ($LiCoO_2$), a lithium nickel cobalt composite oxide (such as $LiNi_{1-x}Co_xO_2$, 0<x<1), a lithium manganese cobalt complex oxide (such as $LiMn_xCo_{1-x}O_2$, 0<x<1), and a lithium iron phosphate ($LiFePO_4$) having an olivine structure.

In a case where a mixture of a lithium-containing nickel-cobalt-manganese composite oxide and another active material is used as the active material, the proportion of the lithium-containing nickel-cobalt-manganese composite oxide in the mixture is preferably 10% by mass or more. Further, as the active material, it is preferable that only the lithium-containing nickel-cobalt-manganese composite oxide is used, that is, 100% by mass of the active material is the lithium-containing nickel-cobalt-manganese composite oxide.

The active material particles may be a mixture of primary particles and secondary particles. The secondary particles are formed of an aggregate of the primary particles. The secondary particles are preferably densely packed with the primary particles. If there are cavities inside the secondary particles, the electrode density tends to decrease.

The average particle size of the active material particles is, for example, 5 μm or more and 7 μm or less. The average particle size is preferably 5.5 μm or more and 6.5 μm or less.

The average particle size of the active material particles can be measured using, for example, a laser diffraction/scattering type particle size distribution measuring apparatus. As a measuring apparatus, the laser diffraction/scattering type particle size distribution measuring apparatus (model: MT3000-II) manufactured by MicrotracBEL Corp. can be used.

A compressive breaking strength of the secondary particles is preferably from 20 MPa or more and 200 MPa or less. When the compressive breaking strength of the secondary particles is within this range, it is easy to adjust the ratio of the primary particles and the secondary particles in the active material-containing layer. That is, when the compressive breaking strength is excessively high, the secondary particles are hardly broken, which may cause a decrease in production efficiency. Further, if the compressive breaking strength of the secondary particles is excessively low, the secondary particles are easily broken, and the abundance ratio of the primary particles in the active material-containing layer tends to be excessively high. A compressive breaking strength of the secondary particles is preferably from 40 MPa or more and 120 MPa or less. More preferably, it is 60 MPa or more and 80 MPa or less.

This compressive breaking strength can be obtained, for example, by the following method. First, after the nonaqueous electrolyte battery is discharged, the battery is disassembled and the electrodes are taken out. This disassembly is performed in a glove box under an atmosphere of an inert gas such as argon. Note that the discharged state refers to a state where the battery is discharged until the charge rate of the battery becomes 0%. That is, the battery is discharged by a constant current discharge at a current value of 1 C until the battery reaches the lower limit value of the operating voltage, and then a constant voltage discharge is performed until the current value reaches 0.2 C. The lower limit of the operating voltage is, for example, 1.5 V.

Next, the removed electrode is washed with a solvent. As the solvent, for example, ethyl methyl carbonate can be used. Next, the washed electrode is dried. Next, the active material-containing layer is peeled off from the dried electrode using, for example, a spatula or the like to obtain a powdery sample. Next, the sample is placed on a jig of a measuring apparatus and tapped to flatten the surface. As the measuring apparatus, a Shimadzu micro compression tester (model: MCT-211) manufactured by Shimadzu Corporation can be used. Next, the sample on the measuring jig is observed with a microscope to confirm the secondary particles. Then, a pressure is continuously applied until the secondary particles are broken, and the compressive strength at the time when the secondary particles are broken is measured. This measurement is performed three times, and the average value of the obtained compressive strengths is defined as the compressive breaking strength of the secondary particles.

The active material-containing layer may further include a conductive agent and a binder in addition to the active material particles.

The conductive agent is used as needed to enhance current collection performance. Examples of the conductive agent include acetylene black, carbon black, and graphite. The type of the conductive agent can be one type or two or more types.

The binder is used for bonding the active material particle and the current collector. Examples of the binder include polytetrafluoroethylene (PTFE), polyvinylidene fluoride (PVdF), fluoro rubber, styrene-butadiene rubber (SBR), polypropylene (PP), polyethylene (PE), and carboxymethyl cellulose (CMC). The type of the binder can be one type or two or more types.

The active material-containing layer contains the active material, the conductive agent, and the binder in a proportion of preferably in ranges 80% by mass or more and 95% by mass or less, 3% by mass or more and 20% by mass or less, and 2% by mass or more and 7% by mass or less, respectively.

The logarithmic differential pore volume distribution curve of the active material-containing layer can be obtained by the mercury intrusion method. The logarithmic differential pore volume distribution curve is a graph in which a horizontal axis represents the pore size and a vertical axis represents the logarithmic differential pore volume. The logarithmic differential pore volume distribution curve of the active material-containing layer obtained by the mercury intrusion method has a first peak and a second peak.

The first peak appears when the pore size is in the range of 0.1 μm or more and 0.5 μm or less. The pore size at which the first peak appears, that is, a first mode diameter, can be said to be the pore size with the highest abundance ratio in the range of 0.1 μm or more and 0.5 μm or less.

The second peak appears when the pore size is in the range of 0.5 μm or more and 1.0 μm or less. The pore size at which the second peak appears, that is, a second mode diameter, can be said to be the pore size with the highest abundance ratio in the range of 0.5 μm or more and 1.0 μm or less. The second mode diameter is larger than the first mode diameter.

An intensity A1 of the first peak and an intensity A2 of the second peak satisfy a relational expression of $0.1 \leq A2/A1 \leq 0.3$. That is, a ratio A2/A1 of the intensity A2 of the second peak to the intensity A1 of the first peak is in the range of 0.1 or more and 0.3 or less.

When the ratio A2/A1 is smaller than 0.1, it is indicated that the abundance ratio of relatively large pores in the electrode is excessively low relative to the abundance ratio of relatively small pores. Here, a relatively large pore is a pore having a pore size of 0.5 Um or more and 1.0 μm or less. A relatively small pore is a pore having a pore size of 0.1 μm or more and 0.5 μm or less. The relatively large pores contribute to the active material-containing layer holding a large amount of electrolyte. Further, such a state may indicate that in the active material-containing layer, the abundance ratio of the primary particles is relatively high, and the abundance ratio of the secondary particles is relatively low. In the active material-containing layer, when the abundance ratio of the secondary particles is low, it is difficult to form a conductive path. Therefore, an electrode having a ratio A2/A1 smaller than 0.1 has low electrolyte impregnation property and electron conductivity of the active material-containing layer, and it is difficult to realize excellent rate characteristics.

In addition, when the ratio A2/A1 is larger than 0.3, it is indicated that the abundance ratio of relatively large pores in the electrode is excessively high relative to the abundance ratio of relatively small pores. Such a state may indicate that in the active material-containing layer, the abundance ratio of the secondary particles is relatively high, and the abundance ratio of the primary particles is relatively low. In the active material-containing layer, when the abundance ratio of the secondary particles is high, the migration length of lithium ions increases. Therefore, when the ratio A2/A1 is larger than 0.3, the diffusivity of lithium ions is low, and it is difficult to realize excellent rate characteristics.

That is, it can be said that an electrode having the ratio A2/A1 in the range of 0.10 or more and 0.30 or less contains relatively small pores and relatively large pores in an appropriate balance. Therefore, the active material-containing layer of the electrode according to the first embodiment has excellent electrolyte impregnation property and electron conductivity, and also has excellent lithium ion diffusivity. Therefore, the battery using the electrode according to the first embodiment can realize excellent rate characteristics. The ratio A2/A1 is preferably 0.10 or more and 0.20 or less, and more preferably 0.10 or more and 0.15 or less.

The intensity A1 of the first peak is preferably 0.030 ml/g or more and 0.250 ml/g or less. When an electrode having the intensity A1 of the first peak within this range is used, the charge/discharge rate characteristics of the battery tend to be further enhanced. The height of the intensity A1 of the first peak is more preferably 0.035 ml/g or more and 0.200 ml/g or less, and still more preferably 0.060 ml/g or more and 0.200 ml/g or less.

The intensity A2 of the second peak is preferably 0.005 ml/g or more and 0.030 ml/g or less. When an electrode having the intensity A2 of the second peak within this range is used, the charge/discharge rate characteristics of the battery tend to be further enhanced. The height of the intensity A2 of the second peak is more preferably 0.010 ml/g or more and 0.030 ml/g or less, and still more preferably 0.010 ml/g or more and 0.025 ml/g or less.

The first mode diameter is preferably 0.10 μm or more and 0.50 μm or less. When an electrode having the first mode diameter within this range is used, the charge/discharge rate characteristics of the battery tend to be further enhanced. The first mode diameter is more preferably 0.10 μm or more and 0.30 μm or less, and still more preferably 0.15 μm or more and 0.30 μm or less.

The second mode diameter is preferably 0.50 μm or more and 1.0 μm or less. When an electrode having the second mode diameter within this range is used, the charge/discharge rate characteristics of the battery tend to be further enhanced. The second mode diameter is more preferably 0.50 μm or more and 0.80 μm or less, and still more preferably 0.65 μm or more and 0.75 μm or less.

Further, according to the mercury intrusion method, a cumulative pore volume distribution curve of the active material-containing layer can be obtained. The cumulative pore volume distribution curve is a graph in which a horizontal axis represents the pore size and a vertical axis represents the cumulative pore volume.

The total pore volume V obtained from the cumulative pore volume distribution curve is preferably 0.100 mL/g or more and 0.200 mL/g or less. When an electrode having a total pore volume V within this range is used, the charge/discharge rate characteristics of the battery tend to be further enhanced. The total pore volume V is more preferably 0.110 mL/g or more and 0.150 mL/g or less, and still more preferably 0.120 mL/g or more and 0.140 mL/g or less.

Further, a cumulative pore volume V1 in the range of the pore size of 0.1 μm or more and 0.5 μm or less, which is obtained from the above-described cumulative pore volume distribution curve, is preferably 0.010 mL/g or more and 0.110 mL/g or less. If an electrode having the cumulative pore volume V1 within this range is used, the charge/discharge rate characteristics of the battery can be further enhanced. The cumulative pore volume V1 is more preferably 0.030 mL/g or more and 0.110 mL/g or less, and still more preferably 0.035 mL/g or more and 0.065 mL/g or less.

The cumulative pore volume V1 and the total pore volume V satisfy a relational expression of $0.2 \leq V1/V \leq 0.8$. That is, a ratio V1/V of the cumulative pore volume V1 to the total pore volume V is 0.2 or more and 0.8 or less. When an electrode having a ratio V1/V within this range is used, the charge/discharge rate characteristics of the battery tend to be further enhanced. The ratio V1/V is more preferably 0.2 or more and 0.6 or less, and still more preferably 0.3 or more and 0.6 or less.

Further, a pore specific surface area obtained from the above-described cumulative pore volume distribution curve is preferably 2.7 cm$^2$/g or more and 3.5 cm$^2$/g or less. When an electrode having a pore specific surface area within this range is used, the charge/discharge rate characteristics of the battery tend to be further enhanced. The pore specific surface area is more preferably 2.7 cm$^2$/g or more and 3.3 cm$^2$/g or less, and still preferably 2.9 cm$^2$/g or more and 3.2 cm$^2$/g or less. This pore specific surface area can be obtained by dividing the surface area of the entire pore size by the mass of the active material-containing layer.

The logarithmic differential pore volume distribution curve and the cumulative pore volume distribution curve of the active material-containing layer by the mercury intrusion method can be obtained, for example, by the following method.

First, the battery is disassembled and the electrodes are taken out in the same manner as described above. Next, the removed electrode is washed with a solvent. As the solvent, for example, ethyl methyl carbonate can be used. Next, the washed electrode is dried. Next, the dried electrode is cut to obtain a test piece. The size of the test piece is, for example, a square shape having a length of 25 mm on each side.

Next, the test piece is folded and placed in a measurement cell of a measuring apparatus, and mercury is caused to intrude the pores of the test piece. As the measuring apparatus, for example, Shimadzu Autopore 9520 (Autopore 9520 model manufactured by Shimadzu corporation) can be used. In the measurement, for example, an initial pressure is set to 20 kPa, and a maximum pressure is set to 414 MPa. Note that 20 kPa is equivalent to approximately 3 psia in terms of pound-force per square inch. In addition, 20 kPa is equivalent to the pressure applied to a sample having pores having a diameter of approximately 60 μm. Also, 414 MPa is equivalent to approximately 59,986 psia in terms of pounds per square inch. In addition, 414 MPa is equivalent to the pressure applied to a sample having pores having a diameter of approximately 0.003 μm. This measurement is performed for each of the three test pieces, and the average value thereof is used as measurement data.

In calculating the pore specific surface area, the calculation is performed assuming that all the pores are cylindrical.

Next, the logarithmic differential pore volume distribution curve and the cumulative pore volume distribution curve are obtained based on the obtained measurement data and Washburn's equation. The Washburn's equation is as follows.

$$D = -4\gamma \cos \theta / P$$

In the above Washburn's equation, P is an applied pressure, D is a pore size, γ is a surface tension of mercury, and θ is a contact angle between mercury and a pore wall surface. The surface tension of mercury is 480 dyne*cm$^{-1}$, and the contact angle between the mercury and the pore wall surface is 140°. That is, in the above equation, γ and θ are constants. Therefore, the relationship between a pressure P and a pore size D can be shown by using the Washburn's equation. Then, by measuring the mercury intrusion volume corresponding to each pressure P and the pore size D, the pore size and the volume distribution thereof can be obtained. Note that, for details of the measurement method and principle of the mercury intrusion method, reference can be made to Non-Patent Literatures 1 and 2.

A density of the active material-containing layer is 2.9 g/cm$^3$ or more and 3.3 g/cm$^3$ or less. If the density of the active material-containing layer is lower than 2.9 g/cm$^3$, sufficient energy density tends not to be realized. If the density of the active material-containing layer is higher than 3.3 g/cm$^3$, there is no pores having a sufficient volume in the active material-containing layer, so that a sufficient amount of the electrolyte tends to be impregnated. The density of the active material-containing layer is preferably 3.0 g/cm$^3$ or more and 3.3 g/cm$^3$ or less.

This density can be obtained, for example, by the following method. First, the battery is disassembled and the electrodes are taken out in the same manner as described above. Next, the active material-containing layer is removed from the electrode using a solvent such as N-methylpyrrolidone (NMP), and the current collector is isolated. Next, the current collector is cut into a predetermined size, and the mass and the thickness are measured. The size of the current collector is, for example, a square shape with a side length of 20 mm. Next, a part of the electrode is cut out to obtain a test piece. The size of the test piece is prismatic with the bottom surface being the same size as the current collector. Next, the mass and thickness of the test piece are measured. Then, the mass and thickness of the active material-containing layer are obtained by subtracting the mass and thickness of the current collector from the mass and thickness of the test piece, respectively. The density of the active material-containing layer can be calculated from the mass and thickness and the area of the bottom surface of the test piece.

Next, a method for manufacturing the electrode according to the first embodiment will be described.

First, secondary particles in which primary particles of active material particles are aggregated are provided.

Next, the secondary particles of active material particles, a conductive agent, a binder, and a solvent are mixed to obtain a slurry. This slurry may include the primary particles of active material particles. As the solvent, for example, N-methylpyrrolidone (NMP) can be used.

Next, this slurry is subjected to a dispersion treatment. By this dispersion treatment, a part of the secondary particles is destroyed to generate primary particles. In this slurry, the proportion occupied by the primary particles and the proportion occupied by the secondary particles can be adjusted by a bead diameter, the number of rotations, and the rotation time of a dispersing machine.

That is, if the bead diameter at the time of the dispersion treatment is large, the secondary particles tend to be easily broken, and the primary particles tend to be easily formed. Further, when the number of rotations of the dispersing machine is large, the secondary particles tend to be easily broken, and the primary particles tend to be easily formed. Further, when the rotation time of the dispersing machine is large, the secondary particles tend to be easily broken, and the primary particles tend to be easily formed. It is preferable to use a bead mill as the dispersing machine. As the bead mill, for example, New Visco Mill (NVM-2) manufactured by Imex Co., Ltd. can be used.

Next, this mixture is applied to both main surfaces of the current collector and dried to obtain an active material-containing layer. Next, a stack of the active material-containing layer and the current collector is subjected to a press treatment. The pressing pressure is preferably 20 kN or more and 100 kN or less, and more preferably 30 kN or more and 60 kN or less. By this press treatment, a part of the secondary particles in the active material-containing layer may be broken to become the primary particles. In addition, the density of the active material-containing layer can be increased by the press treatment. In this way, the electrode according to the first embodiment can be obtained.

The active material-containing layer thus obtained contains the primary particles and the secondary particles of the active material particles. The proportion occupied by the primary particles and the proportion occupied by the secondary particles of the active material particles in the active material-containing layer can be adjusted by the dispersion conditions and the pressing pressure as described above. The distribution of the pore size in the active material-containing layer can be adjusted by adjusting the proportion occupied by the primary particles and the proportion occupied by the secondary particles of the active material particles in the active material-containing layer. That is, in the active material-containing layer, in a case where the proportion occupied by the primary particles is low and the proportion occupied by the secondary particles is high, the proportion occupied by relatively large pores increases, and the proportion occupied by relatively small pores decreases. On the other hand, in the active material-containing layer, in a case where the proportion occupied by the secondary particles is low and the proportion occupied by the primary particles is high, the proportion occupied by relatively large pores decreases, and the proportion occupied by relatively small pores increases.

In the active material-containing layer of the electrode according to the first embodiment, a ratio A2/A1 of the intensity A2 of the second peak to the intensity A1 of the first peak is in the range of 0.1 or more and 0.3 or less. It can be said that the active material-containing layer of such an electrode contains relatively small pores and relatively large pores in an appropriate balance. The active material-containing layer of the electrode according to the first embodiment has excellent electrolyte impregnation property and electron conductivity, and also has excellent lithium ion diffusivity. The active material-containing layer of the electrode according to the first embodiment has a high density of 2.9 g/cm$^3$ or more and 3.3 g/cm$^3$ or less. Therefore, the battery using the electrode according to the first embodiment can realize excellent rate characteristics and high energy density.

Second Embodiment

According to a second embodiment, there is provided a nonaqueous electrolyte battery including a negative electrode, a positive electrode, and an electrolyte. The nonaqueous electrolyte battery according to the second embodiment can be, for example, a lithium ion secondary battery.

The nonaqueous electrolyte battery according to the second embodiment can further include a separator disposed between the positive electrode and the negative electrode. The negative electrode, the positive electrode, and the separator can configure an electrode group. The electrolyte can be held in the electrode group. In the electrode group, the positive electrode active material-containing layer and the negative electrode active material-containing layer may face each other via the separator.

Further, the nonaqueous electrolyte battery according to the second embodiment can further be provided with a container member that accommodates the electrode group and the electrolyte, a negative electrode terminal electrically connected to the negative electrode, and a positive electrode terminal electrically connected to the positive electrode.

Hereinafter, the negative electrode, the positive electrode, the electrolyte, the separator, the container member, the negative electrode terminal, and the positive electrode terminal will be described in detail.

(1) Positive Electrode

As the positive electrode, the electrode according to the first embodiment described above can be used.

(2) Negative Electrode

The negative electrode can include a negative electrode current collector and a negative electrode active material-containing layer formed on the negative electrode current collector.

The negative electrode current collector may include a portion where the negative electrode active material-containing layer is not carried on the surface. This portion can serve as a negative electrode tab. Alternatively, the negative electrode may further include a negative electrode tab separate from the negative electrode current collector. The negative electrode active material-containing layer contains a negative electrode active material.

As the negative electrode current collector, a sheet containing a material with high electric conductivity can be used. For example, an aluminum foil or an aluminum alloy foil can be used as the negative electrode current collector. In a case where the aluminum foil or the aluminum alloy foil is used, a thickness thereof is preferably 20 µm or less. The aluminum alloy foil can include magnesium, zinc, silicon, and the like. Further, the content of transition metals such as iron, copper, nickel, and chromium contained in the aluminum alloy foil is preferably 1% by mass or less.

The negative electrode active material-containing layer of the negative electrode may contain a lithium-titanium composite oxide having a spinel structure as an active material. The lithium-titanium composite oxide having a spinel structure preferably contains $Li_{4+a}Ti_5O_{12}$. In $Li_{4+a}Ti_5O_{12}$, the value of a can change between 0 and 3 depending on the charge/discharge state.

The negative electrode active material may include other active materials in addition to the lithium-titanium composite oxide having a spinel structure. Examples of other negative electrode active materials include monoclinic titanium dioxide ($Li_xTiO_2$ (B)) (the value of x can vary between 0 and 1 depending on the charge/discharge state), and a lithium-titanium composite oxide having a ramsdellite type structure ($Li_{2+x}Ti_3O_7$ (the value of x can vary between 0 and 2 depending on the charge/discharge state)), a monoclinic niobium titanium composite oxide (such as, $Li_xNb_2TiO_7$ (the value of x can vary between 0 and 4 depending on the charge/discharge state)). The type of the negative electrode active material to be used can be one type or two or more types.

The proportion of the lithium-titanium composite oxide having a spinel structure in the negative electrode active material is desirably 30% by mass or more and 100% by mass or less.

The negative electrode active material may be included as particles in the negative electrode active material-containing layer. The average particle size of the primary particles of the negative electrode active material particles is preferably 5 µm or less. When the average particle size of the primary particles is 5 µm or less, an effective area contributing to an electrode reaction can be sufficiently secured, and excellent large-current discharge performance can be obtained in a nonaqueous electrolyte battery. The average particle size of the primary particles of the negative electrode active material can be determined in the same manner as the above-described average particle size of the primary particles of the positive electrode active material.

The negative electrode active material may include an active material other than the above-described oxide. Examples of the active material other than the oxide described above include, for example, a carbonaceous material and a metal compound.

The negative electrode active material-containing layer may further include a conductive agent and a binder, if necessary.

The conductive agent is used as needed to enhance current collection performance. The conductive agent is, for example, a carbon material. The carbon material preferably has a high occlusion property and high conductivity for alkali metal ions. Examples of the carbon material include, for example, acetylene black, carbon black, and graphite. The type of the conductive agent can be one type or two or more types.

The binder is used for bonding the negative electrode active material particles and the negative electrode current collector. Examples of the binder include polytetrafluoroethylene (PTFE), polyvinylidene fluoride, fluoro rubber, styrene-butadiene rubber (SBR), polypropylene (PP), polyethylene (PE), or carboxymethyl cellulose (CMC). The type of the binder can be one type or two or more types.

The negative electrode active material-containing layer contains the negative electrode active material, the conductive agent, and the binder in a proportion of preferably in ranges 70% by mass or more and 95% by mass or less, 0% by mass or more and 25% by mass or less, and 2% by mass or more and 10% by mass or less, respectively.

The negative electrode can be produced, for example, by the following procedures. First, the negative electrode active material, the conductive agent, and the binder are charged into an appropriate solvent, for example, N-methylpyrrolidone to prepare a slurry. This slurry is applied to both main surfaces of the negative electrode current collector, and a coated film is dried. The slurry may be applied only to one main surface of the negative electrode current collector. Next, the dried coated film is pressed to obtain a negative electrode active material-containing layer having a desired density, thereby completing the negative electrode.

(3) Separator

As a separator, a nonwoven fabric or a porous film can be used. Examples of the material of the nonwoven fabric or the porous film include polyolefin such as polyethylene and polypropylene, or a cellulosic polymer. In addition, a separator having compounded these materials, for example, a separator made of a polyolefin porous film and cellulose may be used.

The separator preferably includes pores having a diameter of 10 µm or more and 100 µm or less. Further, the thickness of the separator is preferably 2 µm or more and 30 µm or less.

(4) Nonaqueous Electrolyte

A nonaqueous electrolyte includes, for example, a nonaqueous solvent and an electrolyte salt dissolved in the nonaqueous solvent.

As the nonaqueous solvent, a known nonaqueous solvent used for a nonaqueous electrolyte battery can be used.

First examples of the nonaqueous solvent are a cyclic carbonate such as ethylene carbonate (EC) and propylene carbonate (PC). Second examples of the nonaqueous solvent are a chain carbonate such as dimethyl carbonate (DMC), methyl ethyl carbonate (MEC), and diethyl carbonate (DEC); γ-butyrolactone (γ-BL), acetonitrile, methyl propionate, ethyl propionate; a cyclic ether such as tetrahydrofuran (THF) and 2-methyltetrahydrofuran; and a chain ether such as dimethoxyethane and diethoxyethane. The solvents of the second examples generally have a lower viscosity than the solvents of the first examples. Further, the nonaqueous solvent may be a solvent obtained by mixing the solvent of the first example and the solvent of the second example.

The nonaqueous solvent preferably contains propylene carbonate. More preferably, the nonaqueous solvent contains propylene carbonate and one or more types of the chain carbonates.

The electrolyte salt is, for example, an alkali salt, preferably a lithium salt. The electrolyte salt preferably contains a lithium salt containing fluorine (F). Examples of such lithium salts include lithium hexafluorophosphate ($LiPF_6$), lithium arsenic hexafluoride ($LiAsF_6$), and lithium trifluoromethanesulfonate ($LiCF_3SO_3$). The type of the electrolyte salt can be one type or two or more types. The electrolyte salt preferably contains lithium hexafluorophosphate (LiPF$_6$). The concentration of the electrolyte salt in the nonaqueous electrolyte is preferably 0.5 mol/L or more and 2 mol/L or less.

(5) Negative Electrode Terminal and Positive Electrode Terminal

The negative electrode terminal can function as a conductor for electrons to move between the negative electrode and the external terminal by being partially electrically connected to a part of the negative electrode. The negative electrode terminal can be connected to, for example, a negative electrode current collector, in particular, a negative electrode tab. Similarly, the positive electrode terminal can function as a conductor for electrons to move between the positive electrode and the external circuit by being partially electrically connected to a part of the positive electrode. The positive electrode terminal can be connected to, for example, a positive electrode current collector, in particular, a positive electrode tab. It is preferable that the negative electrode terminal and the positive electrode terminal are formed of a material having high electric conductivity. In a case of being connected to the current collector, these terminals are preferably made of the same material as the current collector in order to reduce contact resistance.

(6) Container Member

As the container member, for example, a metal container or a laminated film container can be used, but is not particularly limited.

By using a metal container as the container member, a nonaqueous electrolyte battery having excellent impact resistance and long-term reliability can be realized. By using a laminate film container as the container member, a nonaqueous electrolyte battery having excellent corrosion resistance can be realized, and the weight of the nonaqueous electrolyte battery can be reduced.

A metal container having a plate thickness, for example, in the range of 0.2 mm or more and 5 mm or less can be used. The plate thickness of the metal container is more preferably 0.5 mm or less.

The metal container preferably contains at least one metal element selected from the group consisting of Fe, Ni, Cu, Sn and Al. The metal container can be formed of, for example, aluminum or an aluminum alloy. The aluminum alloy is preferably an alloy containing elements such as magnesium, zinc, and silicon. When the alloy contains a transition metal such as iron, copper, nickel, and chromium, the content is preferably 1% by mass or less. With this, the long-term reliability and the impact resistance in a high-temperature environment can be remarkably improved.

A film thickness of a laminate film container is, for example, in the range of 0.1 mm or more and 2 mm or less. More preferably, the thickness of the laminated film is 0.2 mm or less.

The laminate film is, for example, a multilayer film made of a metal layer and resin layers sandwiching the metal layer. The metal layer preferably contains a metal containing at least one selected from the group consisting of Fe, Ni, Cu, Sn and Al. The metal layer is preferably an aluminum foil or an aluminum alloy foil for weight reduction. For the resin layer, for example, a polymer material such as polypropylene (PP), polyethylene (PE), nylon, and polyethylene terephthalate (PET) can be used. The laminate film can be formed into a shape of a container member by performing sealing by heat fusion.

Examples of the shape of the container member include a flat type (thin type), a square type, a cylindrical type, a coin type, and a button type. The container member can take various dimensions depending on the application. For example, in a case where a nonaqueous electrolyte battery is used for a portable electronic device, the container member can be reduced in size according to the size of the electronic device to be mounted. In a case where the nonaqueous electrolyte battery is mounted on a two-wheel or four-wheel vehicle, a container for a large battery can be used.

Next, an example of the nonaqueous electrolyte battery according to the second embodiment will be described in more detail with reference to the drawings.

FIG. 1 is a partially cutaway perspective view illustrating an example of a nonaqueous electrolyte battery according to a second embodiment. FIG. 2 is an enlarged sectional view of a part A of the nonaqueous electrolyte battery illustrated in FIG. 1.

A nonaqueous electrolyte battery 100 illustrated in FIGS. 1 and 2 includes a flat electrode group 1. The flat electrode group 1 includes a negative electrode 2, a positive electrode 3, and a separator 4. The electrode group 1 has a structure in which the negative electrode 2 and the positive electrode 3 are spirally wound into a flat shape with the separator 4 interposed therebetween. Although the wound electrode group will be described here, the electrode group may be a stacked electrode group in which a plurality of the negative electrode 2, the separator 4, and the positive electrode 3 are stacked.

As illustrated in FIG. 2, the negative electrode 2 includes a negative electrode current collector 2a and a negative electrode active material-containing layer 2b carried on the negative electrode current collector 2a. As illustrated in FIG. 2, the positive electrode 3 includes a positive electrode current collector 3a and a positive electrode active material-containing layer 3b carried on the positive electrode current collector 3a.

As illustrated in FIG. 1, a strip-shaped negative electrode terminal 5 is electrically connected to the negative electrode 2 in the nonaqueous electrolyte battery 100. More specifically, the negative electrode terminal 5 is connected to the negative electrode current collector 2a. Further, a strip-shaped positive electrode terminal 6 is electrically connected to the positive electrode 3. More specifically, the positive electrode terminal 6 is connected to the positive electrode current collector 3a.

Further, the nonaqueous electrolyte battery 100 further includes a container 7 made of a laminate film as a container. That is, the nonaqueous electrolyte battery 100 includes a container member, the container 7 made of a laminate film.

The electrode group 1 is housed in a container 7 made of the laminate film. Note that, end portions of the negative electrode terminal 5 and the positive electrode terminal 6 extend from the container 7. A nonaqueous electrolyte (not shown) is contained in the container 7 made of the laminate film. The nonaqueous electrolyte is impregnated in the electrode group 1. The container 7 is heat-sealed at a peripheral edge, thereby sealing the electrode group 1 and the nonaqueous electrolyte.

Next, another example of the nonaqueous electrolyte battery according to the first embodiment will be described in detail with reference to FIG. 3. FIG. 3 is a partially cutaway perspective view illustrating another example of the nonaqueous electrolyte battery according to the first embodiment.

A nonaqueous electrolyte battery 200 illustrated in FIG. 3 is different from the nonaqueous electrolyte battery 100 illustrated in FIGS. 1 and 2 in that the container member is configured to include a metal container 17a and a sealing plate 17b.

A flat electrode group 11 includes a negative electrode, a positive electrode, and a separator, similar to the electrode group 1 in the nonaqueous electrolyte battery 100 illustrated in FIGS. 1 and 2. The electrode group 11 has a similar structure to that of the electrode group 1. However, in the electrode group 11, a negative electrode tab 15a and a positive electrode tab 16a are connected to the negative electrode and the positive electrode, respectively, instead of the negative electrode terminal 5 and the positive electrode terminal 6, as described later.

In the nonaqueous electrolyte battery 200 illustrated in FIG. 3, such an electrode group 11 is accommodated in a metal container 17a. The metal container 17a further stores a nonaqueous electrolyte (not shown). The metal container 17a is sealed by a metal sealing plate 17b. The metal container 17a and the sealing plate 17b constitute, for example, a container can as a container material.

One end of the negative electrode tab 15a is electrically connected to the negative electrode current collector, and the other end is electrically connected to the negative electrode terminal 15. One end of the positive electrode tab 16a is electrically connected to the positive electrode current collector, and the other end is electrically connected to the positive electrode terminal 16 fixed to the sealing plate 17b. The positive electrode terminal 16 is fixed to the sealing plate 17b via an insulating member 17c. The positive electrode terminal 16 and the sealing plate 17b are electrically insulated by the insulating member 17c.

The nonaqueous electrolyte battery according to the second embodiment includes the electrode according to the first embodiment. Therefore, the nonaqueous electrolyte battery according to the second embodiment can realize excellent rate characteristics and high energy density.

Third Embodiment

According to the third embodiment, a battery pack is provided. This battery pack includes the nonaqueous electrolyte battery according to the second embodiment.

The battery pack according to the third embodiment can include a plurality of nonaqueous electrolyte batteries. A plurality of nonaqueous electrolyte batteries can be electrically connected in series or electrically connected in parallel. Alternatively, a plurality of nonaqueous electrolyte batteries can be connected in a combination of series and parallel.

The battery pack according to the third embodiment can include, for example, five nonaqueous electrolyte batteries according to the second embodiment. These nonaqueous electrolyte batteries can be connected in series. Also, the nonaqueous electrolyte batteries connected in series can constitute a battery module. That is, the battery pack according to the third embodiment may include a battery module.

The battery pack according to the third embodiment can include a plurality of battery modules. The plurality of battery modules can be connected in series, in parallel, or in a combination of series and parallel.

Hereinafter, an example of the battery pack according to the third embodiment will be described with reference to FIGS. 4 and 5. FIG. 4 is an exploded perspective view schematically illustrating an example of the battery pack according to the third embodiment. FIG. 5 is a block diagram illustrating an example of an electric circuit of the battery pack as illustrated in FIG. 4.

A battery pack 20 illustrated in FIGS. 4 and 5 includes a plurality of unit cells 21. The unit cell 21 may be an example of the flat nonaqueous electrolyte battery 100 according to the second embodiment described with reference to FIG. 1.

The plurality of unit cells 21 are stacked so that the negative electrode terminal 5 and the positive electrode terminal 6 extending outside are aligned in the same direction, and are fastened with an adhesive tape 22 to form a battery module 23. These unit cells 21 are electrically connected to each other in series as illustrated in FIG. 5.

A printed wiring board 24 is disposed so as to face the side surface from which the negative electrode terminal 5 and the positive electrode terminal 6 of the unit cell 21 extend. As illustrated in FIG. 5, the printed wiring board 24 is provided with a thermistor 25, a protective circuit 26, and a terminal 27 for energizing an external device. Note that an insulating plate (not shown) is attached to the printed wiring board 24 on a surface facing the battery module 23 in order to avoid unnecessary connection with the wiring of the battery module 23.

A positive electrode lead 28 is connected to the positive electrode terminal 6 located at the lowermost layer of the battery module 23, and the tip end is inserted into a connector 29 on the positive electrode side of the printed wiring board 24 and electrically connected. A negative electrode lead 30 is connected to the negative electrode terminal 5 located at the uppermost layer of the battery module 23, and the tip end is inserted into a connector 31 on the negative electrode side of the printed wiring board 24 and electrically connected. These connectors 29 and 31 are connected to a protective circuit 26 through wires 32 and 33 formed on the printed wiring board 24.

The thermistor 25 detects the temperature of the unit cell 21, and a detection signal is transmitted to the protective circuit 26. The protective circuit 26 can cut off a plus side wiring 34a and a minus side wiring 34b between the protective circuit 26 and the terminal 27 for energizing the external device under predetermined conditions. An example of the predetermined condition is when the temperature detected by the thermistor 25 is equal to or higher than a predetermined temperature. In addition, another example of the predetermined condition is when over-charge, over-discharge, overcurrent, or the like of the unit cell 21 is detected. The detection of the over-charge or the like is performed for each of the unit cells 21 or the whole battery module 23. When detecting the individual unit cell 21, a battery voltage may be detected, or a positive electrode potential or a negative electrode potential may be detected. In the latter case, a lithium electrode used as a reference electrode is inserted into each unit cell 21. In the battery pack 20 of FIGS. 4 and 5, a wiring 35 for voltage detection is connected to each of the unit cells 21. A detection signal is transmitted to the protective circuit 26 through these wires 35.

Protective sheets 36 made of rubber or resin are arranged on the three side surfaces of the battery module 23 except for the side surfaces from which the positive electrode terminal 6 and the negative electrode terminal 5 protrude.

The battery module 23 is stored in a storage container 37 together with each protective sheet 36 and the printed wiring board 24. That is, the protective sheets 36 are disposed on both the inner side surfaces in the long side direction and the inner side surface in the short side direction of the storage container 37, and the printed wiring board 24 is disposed on the inner side surface opposite to the short side direction. The battery module 23 is located in a space surrounded by the protective sheet 36 and the printed wiring board 24. A lid 38 is attached to an upper surface of the storage container 37.

Note that a heat-shrinkable tape may be used for fixing the battery module 23 instead of the adhesive tape 22. In this case, the protective sheets are arranged on both side surfaces of the battery module, and after wrapped with the heat-shrinkable tape, the battery module is bound by thermally contracting the heat-shrinkable tape.

FIGS. 4 and 5 illustrate the configuration in which the unit cells 21 are connected in series, but those may be connected in parallel to increase the battery capacity. Further, the assembled battery packs can be connected in series and/or in parallel.

Further, the configuration of the battery pack according to the third embodiment may be changed appropriately depending on the application. As the application of the battery pack according to the third embodiment, those in which cycle performance with large current performance is desired are preferable. Specific applications include power supplies for digital cameras, and on-vehicle applications such as two- or four-wheel hybrid electric vehicles, two- or four-wheel electric vehicles, and assisted bicycles. The application of the battery pack according to the third embodiment is particularly suitable for use in the on-vehicle applications.

The battery pack according to the third embodiment includes the nonaqueous electrolyte battery according to the second embodiment. Therefore, the battery pack according to the third embodiment can realize excellent rate characteristics and high energy density.

EXAMPLES

Hereinafter, above embodiments will be described in more detail based on examples.

Example 1

<Production of Positive Electrode>

First, secondary particles made of a lithium-containing nickel-cobalt-manganese composite oxide ($LiNi_{0.33}Co_{0.33}Mn_{0.33}O_2$) were provided as a positive electrode active material. As the secondary particles, those having a compressive breaking strength of 80 MPa obtained by the above-described method were used. Next, the secondary particles, carbon black, and polyvinylidene fluoride were mixed at a mass ratio of 90:5:5 to obtain a mixture. Next, this mixture was dispersed in an N-methylpyrrolidone (NMP) solvent to obtain a mixed solution.

Next, this mixed solution was subjected to a dispersion treatment to prepare a slurry. As a dispersing machine, New Viscomill (NVM-2) manufactured by Imex Co., Ltd. was used. In the dispersion treatment, beads having a diameter of 3.5 mm were used. In addition, the rotation speed of the dispersing machine was set to 2200 rpm, and the rotation time was set to 25 minutes. The obtained slurry was applied to both surfaces of an aluminum foil having a thickness of 20 μm and dried. Next, the dried coated film was subjected to a press treatment to obtain a positive electrode. A load for the press treatment was set to 40 kN.

<Production of Negative Electrode>

$Li_4Ti_5O_{12}$ as a negative electrode active material, carbon black as a conductive agent, and polyvinylidene fluoride as a binder were provided. These were mixed at a mass ratio of 90:5:5 to obtain a mixture. Next, the obtained mixture was dispersed in an N-methylpyrrolidone (NMP) solvent to prepare a slurry. The obtained slurry was applied to both surfaces of an aluminum foil having a thickness of 20 μm and dried. Next, the dried coated film was pressed to obtain a negative electrode.

<Production of Electrode Group>

The positive electrode produced as described above, a separator made of a polyethylene porous film having a thickness of 20 μm, the negative electrode produced as described above, and another separator were stacked in this order. The obtained stack was spirally wound so that the negative electrode was located at the outermost periphery, to produce an electrode group. This was pressed to obtain a flat electrode group.

<Preparation of Nonaqueous Electrolyte>

Ethylene carbonate (EC) and ethyl methyl carbonate (EMC) were mixed at a volume ratio of 1:2 to prepare a mixed solvent. Lithium hexafluorophosphate ($LiPF_6$) was dissolved in this mixed solvent to a concentration of 1 mol/L to prepare a nonaqueous electrolyte.

<Production of Battery>

The electrode group obtained as described above was attached to a can-shaped container made of aluminum having a thickness of 0.3 mm. Next, a nonaqueous electrolyte was injected into the container can containing the electrode group from a liquid inlet provided on the surface of the container can. Next, a nonaqueous electrolyte battery was produced by sealing the liquid inlet. In this manner, a flat nonaqueous electrolyte secondary battery having a thickness of 5 mm, a width of 30 mm, a height of 25 mm, and a weight of 10 g was produced. A rated capacity of the battery was 250 mAh.

Example 2

A battery was obtained in the same manner as in Example 1, except that the rotation speed of the dispersing machine was changed from 2200 rpm to 1800 rpm.

Example 3

A battery was obtained in the same manner as in Example 1, except that the rotation time of the dispersing machine was changed from 25 minutes to 15 minutes.

Example 4

A battery was obtained in the same manner as in Example 1, except that the rotation time of the dispersing machine was changed from 25 minutes to 35 minutes.

Example 5

A battery was obtained in the same manner as in Example 1, except that the rotation speed of the dispersing machine was changed from 2200 rpm to 1800 rpm and the rotation time was changed from 25 minutes to 15 minutes.

Example 6

A battery was obtained in the same manner as in Example 1, except that the rotation speed of the dispersing machine was changed from 2200 rpm to 2400 rpm, the rotation time was changed from 25 minutes to 15 minutes, and the press load to the positive electrode was changed from 40 kN to 60 kN.

Example 7

A battery was obtained in the same manner as in Example 1, except that the rotation speed of the dispersing machine was changed from 2200 rpm to 1800 rpm and the rotation time was changed from 25 minutes to 10 minutes.

Example 8

A battery was obtained in the same manner as in Example 1, except that the secondary particles having a compressive breaking strength of 60 MPa were used instead of using secondary particles having a compressive breaking strength of 80 MPa.

Example 9

A battery was obtained in the same manner as in Example 1, except that the secondary particles having a compressive breaking strength of 120 MPa were used instead of using secondary particles having a compressive breaking strength of 80 MPa, and the press load to the positive electrode was changed from 40 kN to 60 kN.

Example 10

A battery was obtained in the same manner as in Example 1, except that the press load to the positive electrode was changed from 40 kN to 30 kN.

Example 11

A battery was obtained in the same manner as in Example 1, except that the press load to the positive electrode was changed from 40 kN to 60 kN.

Example 12

A battery was obtained in the same manner as in Example 1, except that the rotation speed of the dispersing machine was changed from 2200 rpm to 1800 rpm, and the press load to the positive electrode was changed from 40 kN to 60 kN.

Example 13

A battery was obtained in the same manner as in Example 1, except that the rotation speed of the dispersing machine was changed from 2200 rpm to 2400 rpm, and the press load to the positive electrode was changed from 40 kN to 30 kN.

Example 14

A battery was obtained in the same manner as in Example 1, except that the rotation time of the dispersing machine was changed from 25 minutes to 45 minutes.

Example 15

A battery was obtained in the same manner as in Example 1, except that the rotation time of the dispersing machine was changed from 25 minutes to 10 minutes, and the press load to the positive electrode was changed from 40 kN to 60 kN.

Example 16

A battery was obtained in the same manner as in Example 1, except that the secondary particles having a compressive breaking strength of 200 MPa were used instead of using secondary particles having a compressive breaking strength of 80 MPa.

Example 17

A battery was obtained in the same manner as in Example 1, except that the secondary particles having a compressive breaking strength of 40 MPa were used instead of using secondary particles having a compressive breaking strength of 80 MPa.

Example 18

A battery was obtained in the same manner as in Example 1, except that the rotation speed of the dispersing machine was changed from 2200 rpm to 2400 rpm and the rotation time was changed from 25 minutes to 40 minutes.

Comparative Example 1

A battery was obtained in the same manner as in Example 1, except that the secondary particles having a compressive breaking strength of 20 MPa were used instead of using secondary particles having a compressive breaking strength of 80 MPa.

Comparative Example 2

A battery was obtained in the same manner as in Example 1, except that the rotation time of the dispersing machine was changed from 25 minutes to 45 minutes.

Comparative Example 3

A battery was obtained in the same manner as in Example 1, except that the press load to the positive electrode was changed from 40 kN to 100 kN.

Comparative Example 4

A battery was obtained in the same manner as in Example 1, except that the rotation speed of the dispersing machine was changed from 2200 rpm to 1800 rpm, the rotation time was changed from 25 minutes to 10 minutes, and the press load to the positive electrode was changed from 40 kN to 20 kN.

Comparative Example 5

A battery was obtained in the same manner as in Example 1, except that the press load to the positive electrode was changed from 40 kN to 20 kN.

Comparative Example 6

A battery was obtained in the same manner as in Example 1, except that the secondary particles having a compressive breaking strength of 120 was used instead of using secondary particles having a compressive breaking strength of 80 MPa, the rotation speed of the dispersing machine was changed from 2200 rpm to 1800 rpm, the rotation time was changed from 25 minutes to 10 minutes, and the press load to the positive electrode was changed from 40 kN to 60 kN.

Comparative Example 7

A battery was obtained in the same manner as in Example 1, except that the rotation speed of the dispersing machine was changed from 2200 rpm to 2000 rpm, the rotation time was changed from 25 minutes to 7 minutes, and the bead diameter was changed from 3.5 mm to 2 mm.

Comparative Example 8

A battery was obtained in the same manner as in Example 1, except that the secondary particles having a compressive breaking strength of 20 MPa was used instead of using secondary particles having a compressive breaking strength of 80 MPa, the rotation speed of the dispersing machine was changed from 2200 rpm to 2400 rpm, and the rotation time was changed from 25 minutes to 40 minutes.

(Evaluation Method)

<Measurement of Pore Distribution by Mercury Intrusion Method>

For the positive electrodes obtained in Examples 1 to 18 and Comparative Examples 1 to 8, a logarithmic differential pore volume distribution curve and a cumulative pore volume distribution curve were obtained by the methods described above. Table 2 indicates the results. In the logarithmic differential pore volume distribution curves according to Comparative Examples 1, 7, and 8, the first peak was observed, but the second peak was not observed.

Figure 6:
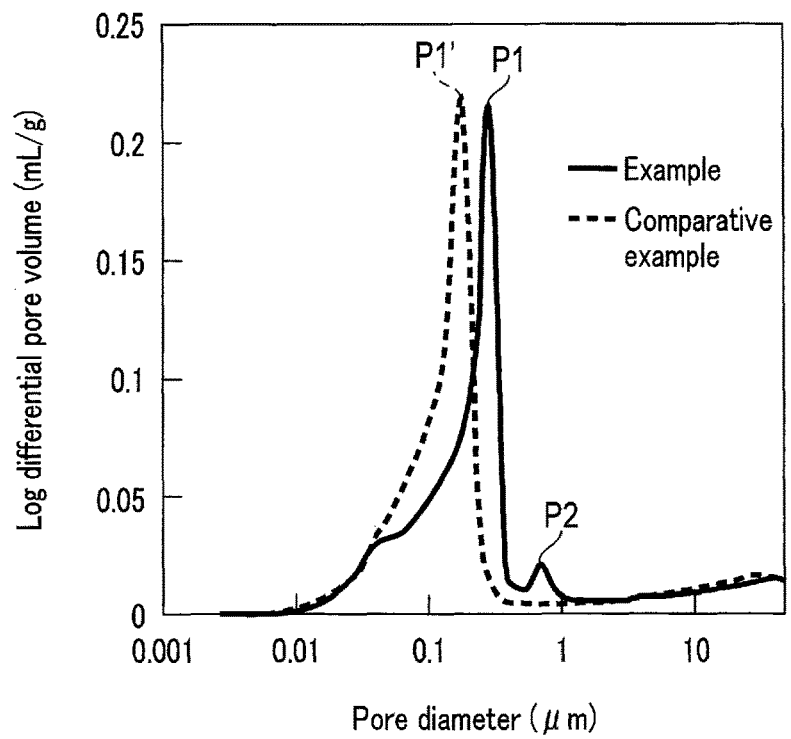
FIG. 6 is a graph illustrating logarithmic differential pore volume distribution curves according to an example and a comparative example.

Here, FIG. 6 is a graph illustrating the logarithmic differential pore volume distribution curves according to an example and a comparative example. In FIG. 6, a horizontal axis represents a pore size, and a vertical axis represents a logarithmic differential pore volume. A solid line in FIG. 6 is a logarithmic differential pore volume distribution curve according to Example 18. As illustrated in FIG. 6, the curve according to Example 18 had a first peak P1 and a second peak P2. In addition, a dashed line in FIG. 6 is a logarithmic differential pore volume curve according to Comparative Example 8. As described above, in the curve according to Comparative Example 8 illustrated in FIG. 6, a first peak P1' was observed, but a second peak was not found.

Figure 7:
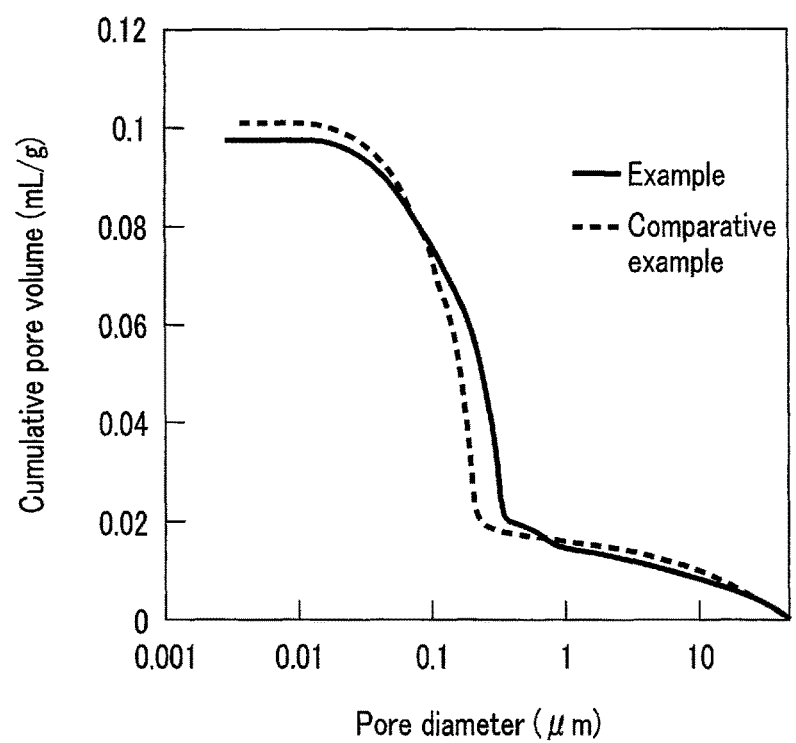
FIG. 7 is a graph illustrating cumulative pore volume distribution curves according to an example and a comparative example.

Further, FIG. 7 is a graph illustrating cumulative pore volume distribution curves according to an example and a comparative example. In FIG. 7, the horizontal axis represents the pore size, and the vertical axis represents the cumulative pore volume. A solid line in FIG. 7 is the cumulative pore volume distribution curve according to Example 18. A dashed line in FIG. 7 is the cumulative pore volume distribution curve according to Comparative Example 8.

<Measurement of Electrode Density>

The densities of the positive electrodes according to Examples 1 to 18 and Comparative Examples 1 to 8 were measured by the above-described method. Table 2 indicates the results.

<Measurement of Battery Capacity>

For the batteries according to Examples 1 to 18 and Comparative Examples 1 to 8, the battery capacity was measured by the following method. First, under an environment of 25° C., the battery was charged at a constant current of 20 mA until the battery voltage reached 2.8V, and then the battery was charged at a constant voltage until the current reached 5 mA. Then, the battery was discharged at a current of 20 mA until the battery voltage reached 1.5V to check the battery capacity. As a result, the discharge capacity of the battery was 250 mAh.

<Evaluation of Rate Characteristics>

For the batteries according to Examples 1 to 18 and Comparative Examples 1 to 8, the rate characteristics were evaluated by the following method. First, the battery was charged at a constant current under an environment of 25° C. at a rate of 1 C until it reached a fully charged state. Next, the battery was discharged at a rate of 1 C until the battery voltage reached 1.5 V to obtain a 1 C discharge capacity. Next, the discharged battery was charged at a constant current at a rate of 1 C until it reached a fully charged state. Next, the battery was discharged at a rate of 5 C until the battery voltage reached 1.5 V to obtain a 5 C discharge capacity. The capacity retention ratio obtained by dividing the 5 C discharge capacity by the 1 C discharge capacity (5 C discharge capacity/1 C discharge capacity) was used as an index for evaluating the rate characteristics. Table 2 indicates the results.

Table 1 below summarizes the producing conditions of the positive electrodes according to the examples and the comparative examples.

TABLE 1

| | Electrode production conditions | | | | |
| --- | --- | --- | --- | --- | --- |
| | Compressive breaking strength (MPa) | Rotation speed (rpm) | Rotation time (min) | Bead diameter (mm) | Electrode press load (kN) |
| Ex. 1 | 80 | 2200 | 25 | 3.5 | 40 |
| Ex. 2 | 80 | 1800 | 25 | 3.5 | 40 |
| Ex. 3 | 80 | 2200 | 15 | 3.5 | 40 |
| Ex. 4 | 80 | 2200 | 35 | 3.5 | 40 |
| Ex. 5 | 80 | 1800 | 15 | 3.5 | 40 |
| Ex. 6 | 80 | 2400 | 15 | 3.5 | 60 |
| Ex. 7 | 80 | 1800 | 10 | 3.5 | 40 |
| Ex. 8 | 60 | 2200 | 25 | 3.5 | 40 |
| Ex. 9 | 120 | 2200 | 25 | 3.5 | 60 |
| Ex. 10 | 80 | 2200 | 25 | 3.5 | 30 |
| Ex. 11 | 80 | 2200 | 25 | 3.5 | 60 |
| Ex. 12 | 80 | 1800 | 25 | 3.5 | 60 |
| Ex. 13 | 80 | 2400 | 25 | 3.5 | 30 |
| Ex. 14 | 80 | 2200 | 45 | 3.5 | 40 |
| Ex. 15 | 80 | 2200 | 10 | 3.5 | 60 |
| Ex. 16 | 200 | 2200 | 25 | 3.5 | 40 |
| Ex. 17 | 40 | 2200 | 25 | 3.5 | 40 |
| Ex. 18 | 80 | 2400 | 40 | 3.5 | 40 |
| Comp. Ex. 1 | 20 | 2200 | 25 | 3.5 | 40 |
| Comp. Ex. 2 | 80 | 2200 | 45 | 3.5 | 40 |
| Comp. Ex. 3 | 80 | 2200 | 25 | 3.5 | 100 |
| Comp. Ex. 4 | 80 | 1800 | 10 | 3.5 | 20 |
| Comp. Ex. 5 | 80 | 2200 | 25 | 3.5 | 20 |
| Comp. Ex. 6 | 120 | 1800 | 10 | 3.5 | 60 |
| Comp. Ex. 7 | 80 | 2000 | 7 | 2 | 40 |
| Comp. Ex. 8 | 20 | 2400 | 40 | 3.5 | 40 |

In the above Table 1, in the column under the heading "Electrode production conditions", the column labeled as "Compressive breaking strength (MPa)" indicates the compressive breaking strength of the secondary particles of the positive electrode active material. The column labeled as "Rotation speed (rpm)" indicates the rotation speed of the dispersing machine. The column labeled as "Rotation time (min)" indicates the rotation time of the dispersing machine. The column labeled as "Bead diameter (mm)" indicates the particle size of the zirconia beads. The column labeled as "Electrode press load (kN)" indicates the load applied to the positive electrode active material-containing layer in the positive electrode press treatment.

Table 2 below summarizes the characteristics of the positive electrodes and the characteristics of the batteries according to the examples and the comparative examples.

TABLE 2

| | Electrode | | | | | | | | | | Battery |
|---|---|---|---|---|---|---|---|---|---|---|---|
| | Peak intensity A1 (ml/g) | Peak intensity A2 (ml/g) | Peak intensity ratio A2/A1 | First mode diameter (μm) | Second mode diameter (μm) | Total pore volume V (ml/g) | Pore volume V1 (ml/g) | Pore volume ratio V1/V | Pore specific surface area (cm²/g) | Electrode density (g/cm³) | 5 C/1 C rate characteristics (%) |
| Ex. 1 | 0.100 | 0.015 | 0.15 | 0.25 | 0.72 | 0.130 | 0.040 | 0.31 | 2.9 | 3.0 | 62 |
| Ex. 2 | 0.090 | 0.025 | 0.28 | 0.34 | 0.80 | 0.138 | 0.074 | 0.54 | 3.1 | 2.9 | 58 |
| Ex. 3 | 0.100 | 0.012 | 0.12 | 0.20 | 0.69 | 0.131 | 0.040 | 0.31 | 3.0 | 3.3 | 63 |
| Ex. 4 | 0.100 | 0.010 | 0.10 | 0.18 | 0.65 | 0.130 | 0.039 | 0.30 | 3.1 | 3.3 | 62 |
| Ex. 5 | 0.097 | 0.029 | 0.30 | 0.38 | 0.92 | 0.136 | 0.080 | 0.59 | 3.1 | 2.9 | 61 |
| Ex. 6 | 0.110 | 0.020 | 0.18 | 0.10 | 0.59 | 0.137 | 0.048 | 0.35 | 3.1 | 3.0 | 60 |
| Ex. 7 | 0.092 | 0.012 | 0.13 | 0.50 | 0.98 | 0.120 | 0.045 | 0.37 | 2.7 | 3.0 | 58 |
| Ex. 8 | 0.048 | 0.012 | 0.25 | 0.40 | 0.50 | 0.138 | 0.067 | 0.48 | 3.1 | 3.0 | 59 |
| Ex. 9 | 0.039 | 0.011 | 0.28 | 0.45 | 1.00 | 0.139 | 0.075 | 0.54 | 3.1 | 2.9 | 60 |
| Ex. 10 | 0.120 | 0.017 | 0.14 | 0.29 | 0.75 | 0.140 | 0.045 | 0.32 | 3.2 | 2.9 | 61 |
| Ex. 11 | 0.087 | 0.013 | 0.15 | 0.22 | 0.70 | 0.140 | 0.044 | 0.31 | 3.2 | 3.1 | 62 |
| Ex. 12 | 0.083 | 0.010 | 0.12 | 0.21 | 0.68 | 0.128 | 0.038 | 0.30 | 2.9 | 3.0 | 63 |
| Ex. 13 | 0.090 | 0.018 | 0.20 | 0.28 | 0.74 | 0.136 | 0.053 | 0.39 | 3.1 | 3.0 | 62 |
| Ex. 14 | 0.100 | 0.013 | 0.13 | 0.28 | 0.73 | 0.134 | 0.030 | 0.22 | 3.0 | 3.0 | 62 |
| Ex. 15 | 0.064 | 0.018 | 0.28 | 0.23 | 0.70 | 0.135 | 0,110 | 0.81 | 3.0 | 2.9 | 62 |
| Ex. 16 | 0.079 | 0.023 | 0.29 | 0.45 | 0.98 | 0.126 | 0.077 | 0.61 | 2.7 | 2.9 | 55 |
| Ex. 17 | 0.118 | 0.019 | 0.16 | 0.34 | 0.63 | 0.142 | 0.042 | 0.30 | 3.3 | 3.1 | 53 |
| Ex. 18 | 0.200 | 0.022 | 0.11 | 0.21 | 0.75 | 0.110 | 0.065 | 0.59 | 3.0 | 3.0 | 62 |
| Comp. Ex. 1 | 0.221 | — | — | 0.24 | — | — | — | — | 3.2 | 3.0 | 36 |
| Comp. Ex. 2 | 0.114 | 0.008 | 0.07 | 0.23 | 0.70 | 0.145 | 0.018 | 0.12 | 2.7 | 3.0 | 42 |
| Comp. Ex. 3 | 0.110 | 0.011 | 0.10 | 0.18 | 0.60 | 0.141 | 0.029 | 0.21 | 2.5 | 3.5 | 38 |
| Comp. Ex. 4 | 0.086 | 0.030 | 0.35 | 0.28 | 0.83 | 0.125 | 0.093 | 0.74 | 3.5 | 2.5 | 39 |
| Comp. Ex. 5 | 0.110 | 0.015 | 0.14 | 0.26 | 0.70 | 0.150 | 0.037 | 0.25 | 2.9 | 2.7 | 32 |
| Comp. Ex. 6 | 0.070 | 0.028 | 0.40 | 0.26 | 0.79 | 0.135 | 0.101 | 0.75 | 3.3 | 3.2 | 35 |
| Comp. Ex. 7 | 0.199 | — | — | 0.24 | — | — | — | — | 3.3 | 3.0 | 32 |
| Comp. Ex. 8 | 0.210 | — | — | 0.18 | — | — | — | — | 3.5 | 2.9 | 32 |

In Table 2 above, in the column under the heading "Electrode", the column labeled as "Peak intensity A1 (ml/g)" and "Peak intensity A2 (ml/g)" respectively indicate the intensity A1 of the first peak and the intensity A2 of the second peak indicated in the logarithmic differential pore volume distribution curve of the positive electrode active material-containing layer. The column labeled as "Peak intensity ratio A2/A1" indicates the ratio A2/A1 of the intensity A2 of the second peak to the intensity A1 of the first peak. In the columns described as "First mode diameter (μm)" and "Second mode diameter (μm)" respectively indicate the first mode diameter and the second mode diameter indicated in the logarithmic differential pore volume distribution curve of the positive electrode active material-containing layer.

The column labeled as "Total pore volume V (ml/g)" indicates the total pore volume V obtained from the cumulative pore volume distribution curve of the positive electrode active material-containing layer. The column labeled as "Pore volume V1 (ml/g)" indicates the cumulative pore volume V1 in the range of 0.1 μm or more and 0.5 μm or less obtained from the cumulative pore volume distribution curve of the positive electrode active material-containing layer. The column labeled as "Pore volume ratio V1/V" indicates the ratio V1/V of the cumulative pore volume V1 to the total pore volume V. The column labeled as "Pore specific surface area (cm²/g)" indicates the pore specific surface area obtained from the cumulative pore volume distribution curve of the positive electrode active material-containing layer.

Further, the column labeled as "Electrode density (g/cm³)" indicates the density of the positive electrode active material-containing layer obtained by the above-described method.

In the column under the heading "Battery", the column labeled as "5 C/1 C rate characteristics (%)" indicate a value obtained by dividing discharge capacity at the 5 C rate by the discharge capacity at the 1 C rate obtained by the evaluation test of the rate characteristics.

As is clear from Table 2, the rate characteristics of the batteries according to Examples 1 to 18 in which the ratio A2/A1 of the intensity A2 of the second peak to the intensity A1 of the first peak was 0.1 or more and 0.3 or less, and the electrode density was 2.9 g/cm³ or more and 3.3 g/cm³, were more excellent than the rate characteristics of the batteries according to Comparative Example 2 in which the ratio A2/A1 was smaller than 0.1, Comparative Examples 4 and 6 in which the ratio A2/A1 was larger than 0.3, Comparative Examples 1, 7, and 8 in which the second peak did not appear, Comparative Example 3 in which the electrode density was higher than 3.3 g/cm³, and Comparative Example 5 in which the electrode density was lower than 2.9 g/cm³. Note that, the cumulative pore volume V1 in the range of the pore size of 0.1 μm or more and 0.5 μm or less and the total pore volume V having an upper limit of 0.2 mL/g, obtained for Examples 1 to 18, satisfied the relational expression of 0.2≤V1/V≤0.8.

That is, it is considered that the electrodes according to Comparative Examples 1, 7 and 8 in which the second peak does not appear in the logarithmic differential pore volume distribution curve, and Comparative Example 2 in which the ratio A2/Al is smaller than 0.1 had an excessively small abundance ratio of relatively large pores in the active material-containing layer. Therefore, it is considered that the active material-containing layers of these comparative examples had insufficient electrolyte impregnation property, and the rate characteristics of the battery were lowered.

Further, it is considered that the electrodes according to Comparative Examples 4 and 6 in which the ratio A2/A1 is larger than 0.3, and the electrode according to Comparative Example 5 in which the electrode density is lower than 2.9 g/cm³ had an excessively high abundance ratio of the secondary particles of the active material particles contained in the active material-containing layer. Therefore, it is considered that the active material-containing layers according to these comparative examples are excellent in the impregnation property of the electrolyte, but low in the lithium ion diffusion property, so that the rate characteristics of the battery are lowered.

In addition, it is considered that the electrode according to Comparative Example 3 having the electrode density higher than 3.3 g/cm³ has a high abundance ratio of relatively small pores in the active material-containing layer and a high abundance ratio of the primary particles in the active material particles. Therefore, it is considered that the rate characteristics of the battery were lowered due to insufficient formation of the conductive paths and low electron conductivity in the active material-containing layer according to Comparative Example 3.

The electrode according to at least one of the embodiments and examples described above has an active material-containing layer including active material particles. The active material particles include particles made of a lithium-containing nickel-cobalt-manganese composite oxide represented by the following Formula (1):

$$Li_{1-x}Ni_{1-a-b}Co_aMn_bO_2 \tag{1}$$

In the Formula (1), x is in the range of $-0.2 \le x \le 0.5$, a is in the range of $0 < a \le 0.4$, and b is in the range of $0 < b \le 0.4$. The logarithmic differential pore volume distribution curve of the active material-containing layer by a mercury intrusion method includes a first peak and a second peak. The first peak is a local maximum value where a pore size is in the range of 0.1 μm or more and 0.5 μm or less. The second peak is a local maximum value in the range where the pore size is in the range of 0.5 μm or more and 1.0 μm or less, and the pore size is larger than the pore size of the first peak. An intensity A1 of the first peak and an intensity A2 of the second peak satisfy a relational expression of $0.1 \le A2/A1 \le 0.3$. A density of the active material-containing layer is 2.9 g/cm³ or more and 3.3 g/cm³ or less.

Such an active material-containing layer of the electrode has excellent electrolyte impregnation property and electron conductivity, and also has excellent lithium ion diffusivity. Therefore, the battery using the electrode according to the embodiment can realize excellent rate characteristics and high energy density.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
an active material-containing layer containing active material particles, and
the active material particles containing particles of a lithium-containing nickel-cobalt-manganese composite oxide represented by the following Formula (1):

$$Li_{1-x}Ni_{1-a-b}Co_aMn_bO_2 \tag{1}$$

in the Formula (1), x is in a range of $-0.2 \le x \le 0.5$, a is in a range of $0 < a \le 0.4$, and b is in a range of $0 < b \le 0.4$,
a logarithmic differential pore volume distribution curve of the active material-containing layer by a mercury intrusion method includes a first peak and a second peak, the first peak is a local maximum value in a range where a pore size is from 0.1 μm or more to 0.5 μm or less, the second peak is a local maximum value in a range where the pore size is from 0.5 μm or more to 0.8 μm or less and in a range where the pore size is larger than the pore size of the first peak,
an intensity A1 of the first peak and an intensity A2 of the second peak satisfy a relational expression of $0.1 \le A2/A1 \le 0.3$, and
a density of the active material-containing layer is from 2.9 g/cm³ or more to 3.3 g/cm³ or less.

2. The electrode according to claim 1, wherein,
in a cumulative pore volume distribution curve of the active material-containing layer by a mercury intrusion method,
a cumulative pore volume V1 in a range where the pore size is front 0.1 μm or more to 0.5 μm or less, and a total pore volume V having an upper limit of 0.2 mL/g satisfy a relational expression of $0.2 \le V1/V \le 0.8$.

3. The electrode according to claim 2, wherein a pore specific surface area obtained from the cumulative pore volume distribution curve of the active material-containing layer by the mercury intrusion method is from 2.7 cm²/g or more to 3.5 cm²/g or less.

4. A nonaqueous electrolyte battery comprising:
the electrode according to claim 1 as a positive electrode;
a negative electrode including a negative electrode active material;
a separator interposed therebetween; and
a nonaqueous electrolyte.

5. A battery pack comprising the nonaqueous electrolyte battery according to claim 4.

* * * * *